United States Patent
Lundberg et al.

(10) Patent No.: US 11,592,404 B2
(45) Date of Patent: Feb. 28, 2023

(54) CLOSE OBJECT DETECTION FOR MONITORING CAMERAS

(71) Applicant: Axis AB, Lund (SE)

(72) Inventors: Stefan Lundberg, Lund (SE); Jonas Hjelmström, Lund (SE)

(73) Assignee: AXIS AB, Lund (SE)

( * ) Notice: Subject to any disclaimer, the term of this patent is extended or adjusted under 35 U.S.C. 154(b) by 257 days.

(21) Appl. No.: 16/950,927

(22) Filed: Nov. 18, 2020

(65) Prior Publication Data

US 2021/0181122 A1 Jun. 17, 2021

(30) Foreign Application Priority Data

Dec. 17, 2019 (EP) ..................................... 19217076

(51) Int. Cl.
*G01N 21/94* (2006.01)
*G06T 7/70* (2017.01)
*G06T 7/00* (2017.01)

(52) U.S. Cl.
CPC ........... *G01N 21/94* (2013.01); *G06T 7/0002* (2013.01); *G06T 7/70* (2017.01); *G06T 2207/10152* (2013.01)

(58) Field of Classification Search
CPC .................. G01N 21/94; G06T 7/0002; G06T 2207/10152; G06V 20/52; G06V 10/141; G06V 10/143; G06V 10/751; G06K 9/62; H05B 45/30; F21Y 2115/10; F21K 9/00; G08B 13/19617
See application file for complete search history.

(56) References Cited

U.S. PATENT DOCUMENTS 5,357,309 A   10/1994   Seki
9,454,820 B1   9/2016   Kirmani et al.
(Continued)

FOREIGN PATENT DOCUMENTS

CN   102445458 A   5/2012
CN   106706659 A   5/2017
(Continued)

OTHER PUBLICATIONS

Keigo Iizuka, "Divergence-ratio axi-vision camera (Divcam): A distance mapping camera", Review of Scientific Instruments 77, 045111 (2006) https://doi.org/10.1063/1.2188827 (Year: 2006).*
(Continued)

*Primary Examiner* — Tarifur R Chowdhury
*Assistant Examiner* — Carlos Perez-Guzman
(74) *Attorney, Agent, or Firm* — Xsensus LLP

(57) ABSTRACT

Methods and apparatus, including computer program products, for determining a presence of an object located close to a lens (301) of a camera monitoring a scene. A first infrared illumination source (302) arranged to illuminate the scene from a first angle is activated. A first image (304) is acquired by the image capturing device (300). The first infrared illumination source (302) is deactivated, and a second infrared illumination source (306) arranged to illuminate the scene from a second angle is activated. A second image (308) is acquired by the image capturing device (300). Intensity information of the first image (304) and the second image (308) is compared to determine the presence of an object located close to the lens (301).

14 Claims, 3 Drawing Sheets

(56) References Cited

U.S. PATENT DOCUMENTS

| | | |
|---|---|---|
| 2014/0084166 A1 | 3/2014 | Cole |
| 2015/0355030 A1 | 12/2015 | Au et al. |
| 2016/0364966 A1* | 12/2016 | Dixon .............. G08B 13/19606 |
| 2022/0230216 A1* | 7/2022 | Buibas ...................... G06T 7/97 |

FOREIGN PATENT DOCUMENTS

| | | |
|---|---|---|
| JP | 4-50610 A | 2/1992 |
| JP | 2009-81649 A | 4/2009 |
| JP | 2009-150841 A | 7/2009 |

OTHER PUBLICATIONS

Extended European Search Report received for EP Application No. 19217076.9, dated Jun. 12, 2020, 7 pages.

* cited by examiner

CLOSE OBJECT DETECTION FOR MONITORING CAMERAS

CROSS REFERENCE TO RELATED APPLICATIONS

This application claims priority to European Patent Application No. 19217076.9 filed on Dec. 17, 2019, the content of which is incorporated herein by reference.

BACKGROUND

The present invention relates to cameras, and more specifically to detecting objects that are located in close proximity to a lens of a camera.

Camera health monitoring is becoming popular, especially in large monitoring systems that may contain hundreds or thousands of where it may not be practically feasible to manually monitor the status of each camera. One common problem that occurs with monitoring cameras, both in indoor and outdoor environments, is that spiders and insects get attracted to the infrared light that is often built into the cameras.

The insects (e.g., butterflies, moths, etc.) and spiders may either sit on the lens itself or be located in close proximity to the lens, thereby blocking the view of the camera and making the camera less useful for detecting events that occur in the scene that is monitored by the camera. When the insect or spider moves across the lens or across the view, it may also trigger false alarms, as the camera analytics software may interpret its movements as being movements in the scene rather than movements in close proximity to or on the lens itself.

Further, spiders in particular (but also some insects) may leave "belongings" in front of the lens. One example of such a belonging is a spiderweb. As smaller insects and spiders get attracted by the infrared light in the camera, insects and spiders tend to leave their belongings in front of the lens. When belongings, such as a spiderweb, are illuminated by the lights of the camera, especially when there are water droplets in the belongings, a significant portion of the light gets reflected back into the camera sensor by the belongings, rendering the camera more or less useless for monitoring purposes until the belongings have been removed. There may also be situations when a camera is tampered with by a human for illegal purposes, for example, by obscuring the lens by placing some kind of object in close proximity to the lens.

For at least these reasons, it is desirable to have ways of automatically detecting objects that are close to the lens, such that false alarms can be avoided and/or to get an indication that some action on the camera (e.g., removing the obstacle) is required.

SUMMARY

According to a first aspect, the invention relates to a method, in a computer system, for determining a presence of an object located close to a lens through which an image capturing device monitors a scene. The method includes:
  activating a first infrared illumination source arranged to illuminate the scene from a first angle;
  acquiring a first image by the image capturing device;
  deactivating the first infrared illumination source, and activating a second infrared illumination source arranged to illuminate the scene from a second angle;
  acquiring a second image by the image capturing device; and
  comparing intensity information of the first image and the second image to determine the presence of an object located close to the lens.

This provides a way of improving techniques for detecting objects that are close to the lens, and often without having to make any modifications to the hardware setup of the camera, as conventional cameras typically have illuminators that can be controlled to illuminate scenes from differing angles. As a consequence of being able to automatically determine whether an object is present close to the lens, the number of false alarms can be decreased, and appropriate alerts can be generated in the event anything needs to be attended to with respect to the camera. It also reduces the need for manual intervention and monitoring of individual camera feeds, and can thus also contribute to cost savings with respect to maintaining the camera system.

According to one embodiment the first infrared illumination source and the second infrared illumination source are arranged to illuminate the object with essential equal intensities and wavelengths. Having equal intensities and wavelengths for the illumination from both sides creates conditions that are as similar as possible in terms of illumination and take away any discrepancies that might occur from the illuminated object having different reflecting properties for different wavelengths. It also facilitates comparison of images and makes it easier to more clearly identify the differences that arise purely from the illumination of the object from two different angles.

According to one embodiment, the first and second infrared illumination sources each comprise one or more infrared light emitting diodes. Light emitting diodes (LEDs) are standard elements in most cameras, and by using already existing components, no major modifications need to be made to the camera hardware. The number of LEDs in each illumination source may also vary. In some cases, a single LED in each source may be sufficient and in other cases multiple LEDs in each illumination source may be required.

According to one embodiment, the method further comprises deactivating the second infrared illumination source, and activating a third infrared illumination source arranged to illuminate the scene from a third angle; acquiring a third image; and comparing intensity information of the first image, the second image, and the third image to determine the presence of an object located close to the lens. Being able to use more than two infrared illumination sources can allow a better determination as to the presence of an object, both because more images can be obtained, and because it allows pairwise comparison among the three images. This creates greater certainty in determining the presence of an object close to the lens.

According to one embodiment, the method further comprises activating and deactivating a third infrared illumination source along with activating and deactivating the first infrared illumination source; and activating and deactivating a fourth infrared illumination source along with activating and deactivating the second infrared illumination source, wherein the first and third infrared illumination sources are arranged essentially orthogonally from the second and fourth infrared illumination sources. Using two groups of illumination sources that are arranged essentially orthogonally with respect to each other provides not only good illumination, but also enhances any intensity differences that may arise as a result of an object located close to the lens, thereby improving the accuracy of the detection of such an object.

According to one embodiment, comparing intensity information includes: compensating for overall intensity differences between the first image and the second image; determining whether any local intensity differences remain; and in response to a positive determination that there are local intensity differences, providing an indication of the presence of an object located close to the lens. Intensity comparisons are computationally low-cost comparisons to make, and by first compensating for overall intensity differences, any local intensity differences will show up more clearly in the image comparison, thus allowing for an easy determination of the presence of an object close to the lens.

According to one embodiment, the method further comprises: comparing a local intensity difference pattern to a reference intensity difference pattern; and providing an indication of the presence of an object located close to the lens when there is a match between the local intensity difference pattern and the reference intensity difference pattern. Having a different reference intensity patterns may allow not only detection of an object close to the lens, but also—at least to some degree—identification of what the object might be. For example, a butterfly may provide a different intensity pattern compared to a spider web, or compared to someone having tampered with the camera, and may require different types of actions to be taken. Thus, different types of alerts could be generated based on what the most likely object is.

According to one embodiment, the method can include using a neural network to evaluate the local intensity differences and make a determination as to the presence or absence of an object located close to the lens. Similar to what was described above, a neural network can be taught to automatically identify specific objects based on their intensity profile.

According to one embodiment, the method can include: in response to determining that there is an object located close to the lens, sending a notification to a camera operator. As was mentioned above, the notification can be automatically generated based on the result of the detection. There may also be various types of notifications, or different types of personnel may be notified based on what the object possibly might be. For example, it may be more urgent to address a situation where a camera has been tampered with, compared to a situation where a spiderweb has been detected.

According to one embodiment, the object can be a spider, an insect, a belonging of a spider, or a belonging of an insect. These are some examples of various insects and "belongings" that are common causes of problems in environments where monitoring cameras have been set up.

According to one embodiment, acquiring the first image by the image capturing device and acquiring the second image by the image capturing device includes acquiring several short exposure images and combining the short exposure images into the first image and the second image, respectively. This can be useful in situations where the scene monitored by the camera includes a lot of movement, such as when the camera looks out over water with waves or where is a tree in the background with branches and leaves moving in the wind. By adding or averaging several short exposure pictures of this kind, such movement can be evened out and more accurate identification of an object close to the lens can be obtained.

According to one embodiment, acquiring the initial image by the image capturing device and acquiring the final image by the image capturing device includes acquiring several short exposure images and combining the short exposure images into the initial image and the final image, respectively. Similar advantages to those described in the previous paragraph can be obtained for the initial and final image.

According to a second aspect, the invention relates to a system for determining a presence of an object located close to a lens through which an image capturing device monitors a scene. The memory contains instructions that when executed by the processor causes the processor to perform a method that includes:
   activating a first infrared illumination source arranged to illuminate the scene from a first angle;
   acquiring a first image by the image capturing device;
   deactivating the first infrared illumination source, and activating a second infrared illumination source arranged to illuminate the scene from a second angle;
   acquiring a second image by the image capturing device; and
   comparing intensity information of the first image and the second image to determine the presence of an object located close to the lens.

The system advantages correspond to those of the method and may be varied similarly.

According to a fourth aspect, the invention relates to a computer program for determining a presence of an object located close to a lens through which an image capturing device monitors a scene. The computer program contains instructions corresponding to the steps of:
   activating a first infrared illumination source arranged to illuminate the scene from a first angle;
   acquiring a first image by the image capturing device;
   deactivating the first infrared illumination source, and activating a second infrared illumination source arranged to illuminate the scene from a second angle;
   acquiring a second image by the image capturing device; and
   comparing intensity information of the first image and the second image to determine the presence of an object located close to the lens.

The computer program involves advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

As was described above, one goal with the various embodiments of the invention is to be able to automatically detect objects that are close to the lens, such that false alarms can be avoided and/or to get an indication that some action on the camera (e.g., removing the obstacle) is required. The invention stems from the general principle that objects that are close to the lens of the camera will look different, that is, have different intensities in an image, when they are illuminated from different angles. Therefore, when two images are recorded by a camera, and the images are captured using IR illumination from different angles, objects in the image will look different (i.e., have different intensities in the acquired images). Thus, by comparing the acquired images, and in particular looking for local intensity differences between the acquired images, it can be concluded whether an object is present close to the lens. What is considered "close" may vary, depending on the particular situation at hand, but as a general guideline, "close" to the camera in this context refers to objects that are located within approximately 0.5 meters of the camera, and preferably within 0.2 meters from the lens of the camera. In response to detecting an object, an appropriate alert can be generated to address the issue. Various embodiments will now be described in further detail by way of example and with reference to the figures.

Figure 1:
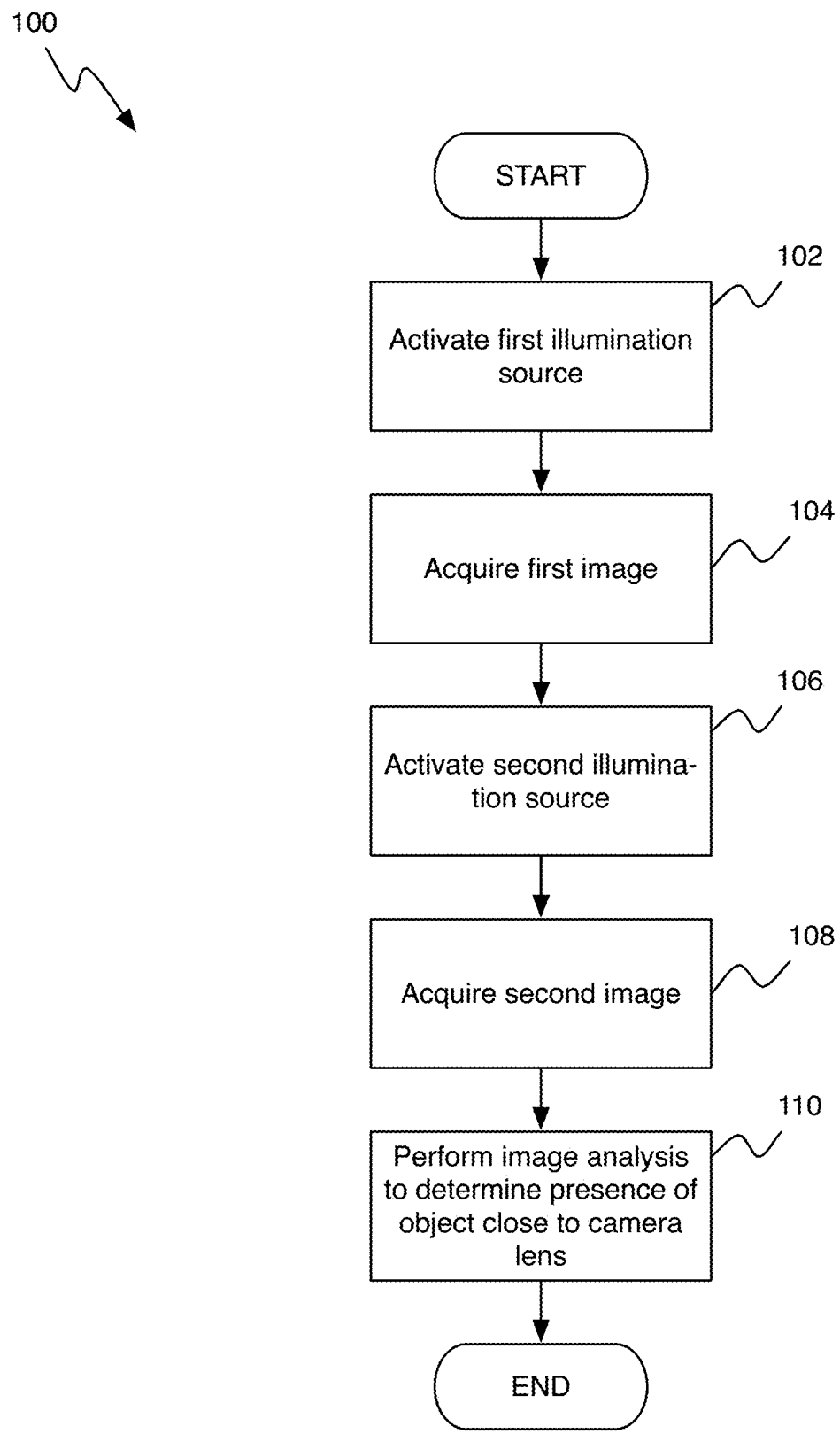
FIG. 1 is a flowchart showing a method 100 for determining whether an object is present close to a lens, in accordance with one embodiment.
Figure 3:
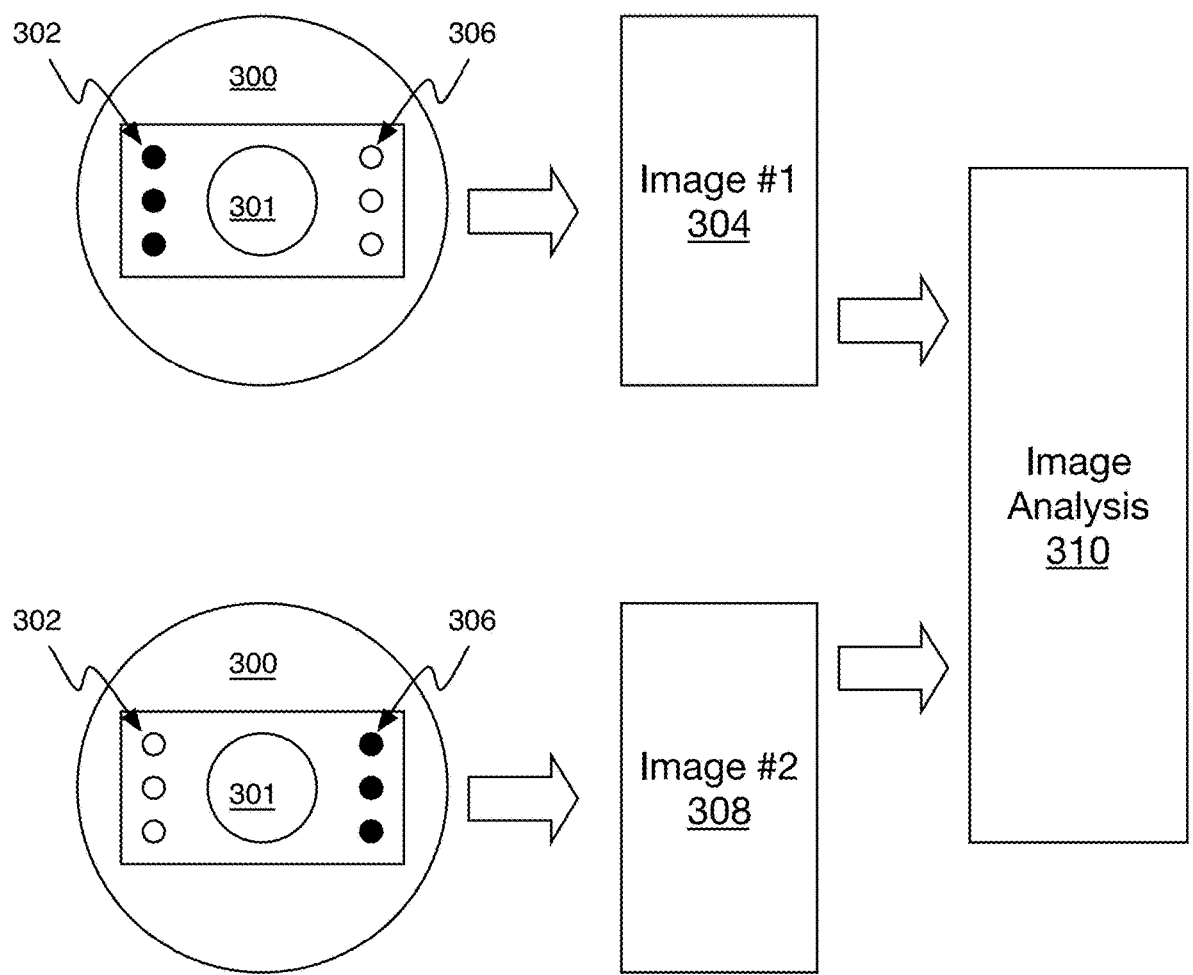
FIG. 3 is a schematic diagram showing a camera 300 with separate IR illumination sources, images captured by the camera and an image analysis component, in accordance with one embodiment.

FIG. 1 is a flowchart showing a method 100 for determining whether an object is present close to a lens, in accordance with one embodiment. This method 100 can be performed automatically at various intervals, as needed, to efficiently detect objects that are located close to the lens. As can be seen in FIG. 1, the method 100 begins by activating a first infrared illumination source, step 102. This is schematically illustrated in FIG. 3, which schematically shows a monitoring camera 300 with a first infrared illumination source 302 activated. Typically, the infrared illumination source includes several IR LEDs, which are conventional in most cameras that are used for purposes of monitoring scenes. However, IR LEDs are not the only type of illuminators that can be used in conjunction with the invention and other types of illuminators such as laser diodes could also be used.

Next, a first image is captured, step 104. This image is shown schematically as image #1, 304, in FIG. 3. The image is typically captured using the same type of image capture as is used by the camera 300 during normal operation, for example, using a CMOS sensor in combination with rolling shutter technique.

When the first image has been captured, the first infrared illumination source 302 is turned off and a second infrared illumination source 306 is turned on, step 106. Typically, the first and second infrared illumination sources 302, 306 are located at the opposite side of the lens 301 to be able to illuminate the object from two opposite angles (e.g., top and bottom, or left and right, etc.). However, it should be noted that this is not a requirement, and that there could be a smaller angular distance between the first infrared illumination source 302 and the second infrared illumination source 306. One or more IR LEDs could also be part of both the first group 302 and the second group 306. Further, it should be noted that while the first and second infrared illumination sources 302, 306 are shown in FIG. 3 as being integrated in the camera 300, they could also be separate units that are placed outside (e.g. on either side) of the camera 300 itself. With the second infrared illumination source turned on, a second image 308 is acquired, step 108, in the same way as the first image 304 was acquired.

Finally, image analysis 310 is performed to determine whether an object is present close to the lens, step 110. It should be noted that this image analysis 310 is not concerned with the actual depths of the objects themselves—it merely pertains to determining whether an object is present or not close to the lens. This is a significant advantage, as depth determination typically requires considerable data processing. The comparably low computing resources needed for the various embodiments of the present invention makes it possible to implement it in environments where there may not be significant computing resources available, such as in the camera itself, for example. In addition, having lower computing resource requirements allows overall power consumption for the camera to be reduced. This is important, not only to reduce heat, but also when the LEDs are used nighttime, since the camera power supply is limited by the power available in accordance with the Ethernet standard.

In one embodiment, the image analysis 310 works as follows. First, any global intensity differences between the two images are calculated and compensated for. Such global intensity differences can be, for example, due to exposure differences or IR LED strength differences. This global intensity difference is the same for all pixels in the image and can be compensated for by adding the global intensity difference to one of the images to even out the global intensity difference.

Next, it is determined whether there are any local intensity difference patterns between the first image 304 and the second image 308. Expressed differently, it is determined whether the intensities differ more in some areas than other areas between the images. If such a local pattern exists, this is an indication of the presence of a close object. In some embodiments, this analysis alone may result in a positive determination of a close object. In other embodiments, it can serve as an indication that a more advanced analysis may be needed, for example, where the determined local pattern is compared to reference intensity difference patterns to identify the type of object. Based on this image analysis, an alert can be generated to a user of the camera system or to some maintenance crew. Alternatively, the alert can serve as a trigger to an automated system, such as wipers, vibration, noise, etc., for removing, for example, spiderweb from the area close to the lens. Many such variations can be envisioned by those having ordinary skill in the art.

In many cameras, a portion of their housing protrudes above and/or on the sides of the lens a certain distance to act as a weather protection (similar to how awnings on houses often protrude above the windows). Generally this camera housing protrusion is not shown in the images captured by the lens. However, when the first and second infrared illumination sources are lit, this could sometimes cause light to bounce off the protrusion, which creates a weak, but stable intensity difference between the two images that are recorded with the first and second illumination sources are activated. This discrepancy can be addressed by recording two calibration images, in which each illumination source is activated in a completely dark room and without any object close to the lens, and then storing these calibration images in the camera. When the camera later on is in use and registers the first and second images, each of these two calibration pictures can first be subtracted from its respective image prior to performing the image processing described above. In this manner any intensity differences arising as a result of the configuration of the camera housing can be taken into account.

Figure 2:
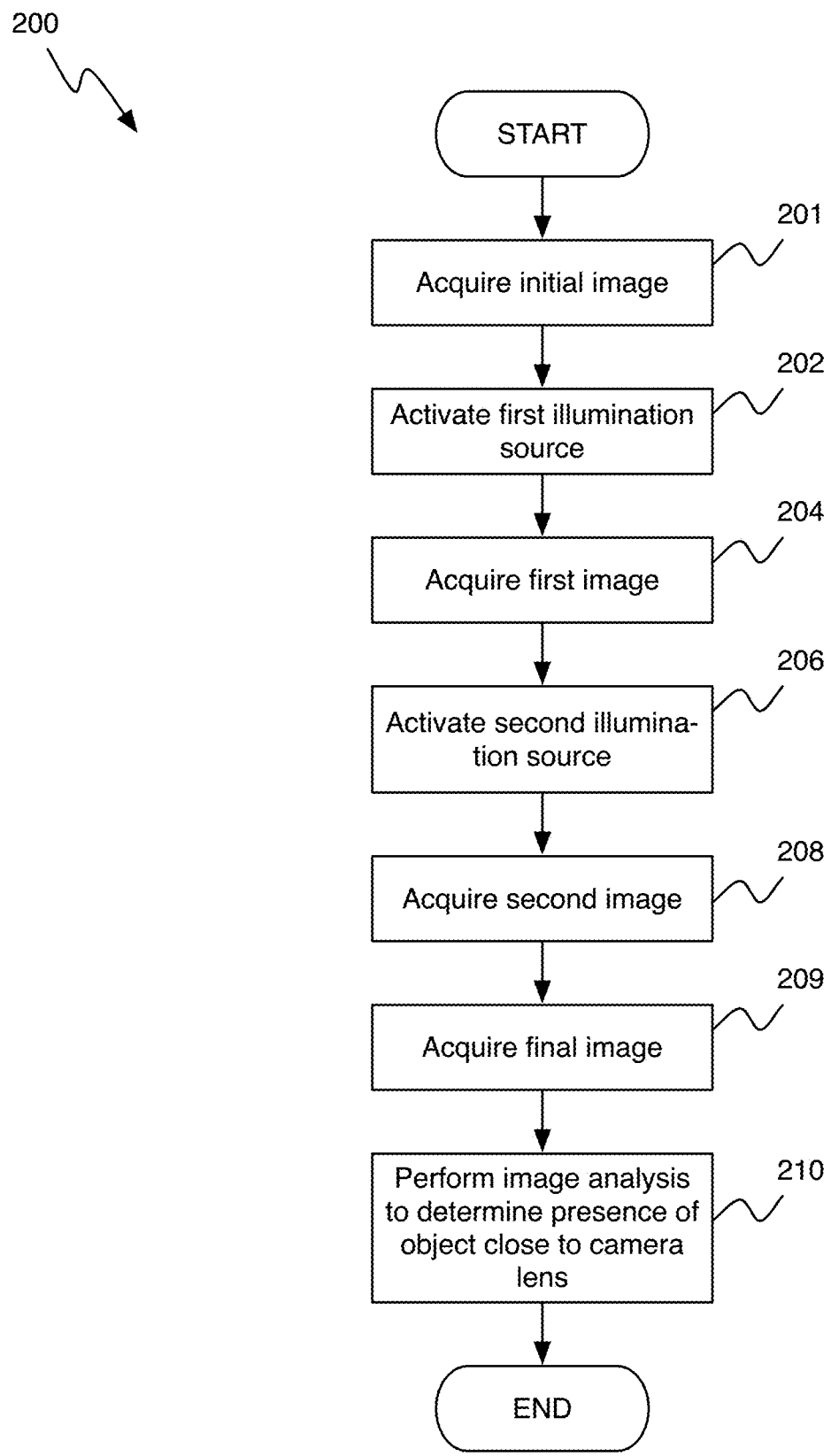
FIG. 2 is a flowchart showing a method 200 for determining whether an object is present close to a lens, in accordance with one embodiment.

FIG. 2 is a flowchart showing a method 200 for determining whether an object is present close to a lens, in accordance with a different embodiment. In FIG. 2, an initial image is first captured in step 201. The initial image is captured with both IR illumination sources turned on when the scene is dark (e.g., at night), and with both IR illumination sources turned off when the scene is light (e.g. during daytime). Steps 202-208 are then performed in a corresponding way to steps 102-108 described above with reference to FIG. 1. After acquiring the second image in step 208, a final image is acquired in step 209. This final image is, just like the initial image, also captured with both IR illumination sources turned on or turned off, depending on whether the scene is dark or light.

The image analysis in step 210 is similar to the image analysis in step 110, but with one significant difference. In addition to the image analysis described in step 110, the initial image captured in step 201 is compared to the final image captured in step 209. If these images, which were both captured with both IR illumination sources turned on or turned off, differ from each other, this is an indication that there likely was movement in the scene during the capture of the first and second image. That is, any differences detected when comparing the first and second images may not actually be due to an object being close to the lens, but could instead be due to movement in the scene captured by the camera. Therefore, capturing and comparing the initial image and the final image on either side of the capturing of the first and second images, may serve as a good additional "verification" that the result obtained when comparing the first and second images is indeed valid.

It should be noted that while the description has focused on two images and two IR illumination sources, the same concepts can be extended to any number of images and any number of IR illumination sources. The exact choice of how many images or IR illumination sources should be used in a given situation fall well within the skills of those having ordinary skill in the art.

Further, as was mentioned above, instead of capturing a single first image, a single second image, and so on, in some implementations multiple short exposure images are captured and then added together to form the first and second images, respectively. This is beneficial in that it allows intensity differences that are due to movement in the image to be taken into account. For example, a camera may be overlooking the ocean, or there might be a tree moving in the wind within the camera's field of view. Effects from these types of movement can be mitigated with this type of setup where several short exposure images are taken rather than a single one.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a presence of an object located close to a lens through which an image capturing device monitors a scene, the method comprising:
    activating a first infrared illumination source arranged to illuminate the scene from a first angle;
    acquiring a first image by the image capturing device corresponding to the scene illuminated from the first angle;
    deactivating the first infrared illumination source, and activating a second infrared illumination source arranged to illuminate the scene from a second angle;
    acquiring a second image by the image capturing device corresponding to the scene illuminated from the second angle; and
    determining the presence of the object located close to the lens based on a comparison of intensity information of the first image and the second image,
    wherein the comparing the intensity information includes:
        compensating for an overall intensity difference between the first image and the second image; and
        determining whether at least one local intensity difference remains after compensating for the overall intensity difference; and
    wherein the determining the presence of the object located close to the lens is based on a positive determination that the at least one local intensity difference remains.

2. The method of claim 1, wherein the first infrared illumination source and the second infrared illumination source are arranged to illuminate the object with essential equal intensities and wavelengths.

3. The method of claim 1, wherein the first and second infrared illumination sources each comprises one or more infrared light emitting diodes.

4. The method of claim 1, further comprising:
    deactivating the second infrared illumination source, and activating a third infrared illumination source arranged to illuminate the scene from a third angle;
    acquiring a third image corresponding to the scene illuminated from the third angle; and
    determining the presence of the object located close to the lens based on comparing intensity information of the first image, the second image, and the third image.

5. The method of claim 1, further comprising:
    activating and deactivating a third infrared illumination source along with activating and deactivating the first infrared illumination source; and
    acquiring a third image corresponding to the activating and deactivating of the third infrared illumination source;
    activating and deactivating a fourth infrared illumination source along with activating and deactivating the second infrared illumination source,
    acquiring a fourth image corresponding to the activating and deactivating of the fourth infrared illumination source; and
    determining the presence of the object located close to the lens based on comparing intensity information of the first image, the second image, the third image and the fourth image,
    wherein the first and third infrared illumination sources are arranged essentially orthogonally from the second and fourth infrared illumination sources.

6. The method of claim 1,
    wherein the comparing the intensity information further includes:
        in response to the positive determination that the at least one local intensity difference remains, comparing a pattern of the at least one local intensity difference to a reference intensity difference pattern; and
    wherein the determining the presence of the object located close to the lens is based on a match between the pattern of the at least one local intensity difference and the reference intensity difference pattern.

7. The method of claim 6, further comprising:
    using a neural network to determine a presence of the match between the pattern of the at least one local intensity difference and the reference intensity difference pattern.

8. The method of claim 1, further comprising:
    capturing an initial image, prior to capturing the first image, using both the first infrared illumination source and the second infrared illumination source;
    capturing a final image, subsequent to capturing the second image, using both the first infrared illumination source and the second infrared illumination source;
    comparing intensity information of the initial image and the final image to determine whether there is movement in the scene; and
    in response to determining there is no movement in the scene, validating the determination of the presence of the object located close to the lens.

9. The method of claim 1, further comprising:
in response to determining that the object is located close to the lens, sending a notification to a camera operator.

10. The method of claim 1, wherein the object is one or more of: a spider, an insect, a belonging of a spider, or a belonging of an insect.

11. The method of claim 1, wherein acquiring the first image by the image capturing device and acquiring the second image by the image capturing device includes acquiring plural exposure images having corresponding predetermined exposure lengths and combining the plural exposure images into the first image and the second image, respectively.

12. The method of claim 8, wherein acquiring the initial image by the image capturing device and acquiring the final image by the image capturing device each includes acquiring plural exposure images having corresponding predetermined exposure lengths and combining the plural exposure images into the initial image and the final image, respectively.

13. A system for determining a presence of an object located close to a lens through which an image capturing device monitors a scene, comprising:
a memory;
an image capturing device;
a first infrared illumination source;
a second infrared illumination source; and
a processor,
wherein the memory contains instructions that when executed by the processor causes the processor to perform a method that includes:
activating the first infrared illumination source arranged to illuminate the scene from a first angle;
acquiring a first image by the image capturing device corresponding to the scene illuminated from the first angle;
deactivating the first infrared illumination source, and activating a second infrared illumination source arranged to illuminate the scene from a second angle;
acquiring a second image by the image capturing device corresponding to the scene illuminated from the second angle; and
determining the presence of the object located close to the lens based on a comparison of intensity information of the first image and the second image,
wherein the comparing the intensity information includes:
compensating for an overall intensity difference between the first image and the second image; and
determining whether at least one local intensity difference remains after compensating for the overall intensity difference; and
wherein the determining the presence of the object located close to the lens is based on a positive determination that the at least one local intensity difference remains.

14. A non-transitory computer readable storage medium having program instructions embodied therewith for causing a processor to perform a method for determining a presence of an object located close to a lens through which an image capturing device monitors a scene, the method comprising:
activating a first infrared illumination source arranged to illuminate the scene from a first angle;
acquiring a first image by the image capturing device corresponding to the scene illuminated from the first angle;
deactivating the first infrared illumination source, and activating a second infrared illumination source arranged to illuminate the scene from a second angle;
acquiring a second image corresponding to the scene illuminated from the second angle; and
determining the presence of the object located close to the lens based on a comparison of intensity information of the first image and the second image,
wherein the comparing the intensity information includes:
compensating for an overall intensity difference between the first image and the second image; and
determining whether at least one local intensity difference remains after compensating for the overall intensity difference; and
wherein the determining the presence of the object located close to the lens is based on a positive determination that the at least one local intensity difference remains.

* * * * *